United States Patent [19]
Ito et al.

[11] Patent Number: 5,499,221
[45] Date of Patent: Mar. 12, 1996

[54] CD-ROM RETRIEVAL APPARATUS

[75] Inventors: Tamotsu Ito, Ayase; Toshiyuki Oda, Chigasaki; Takashi Takeuchi, Fujisawa; Shiyouichirou Funato, Yokohama, all of Japan

[73] Assignee: Hitachi, Ltd., Tokyo, Japan

[21] Appl. No.: 167,110

[22] Filed: Dec. 16, 1993

Related U.S. Application Data

[63] Continuation of Ser. No. 621,041, Dec. 3, 1990, abandoned.

[30] Foreign Application Priority Data

Dec. 6, 1989 [JP] Japan ................................. 1-315221
Jan. 26, 1990 [JP] Japan ................................. 2-14940

[51] Int. Cl.⁶ ................................................. G11B 7/00
[52] U.S. Cl. .......................... 369/32; 369/48; 369/50; 369/52; 369/47; 358/342; 348/836
[58] Field of Search .......................... 369/32, 48, 50, 369/52, 47; 358/342, 254, 322; 348/836

[56] References Cited

U.S. PATENT DOCUMENTS

| | | | |
|---|---|---|---|
| 4,633,323 | 12/1986 | Haberkern et al. | 358/254 |
| 4,635,110 | 1/1987 | Weinblatt | 358/254 |
| 4,639,225 | 1/1987 | Washizuka | 358/254 |
| 4,691,310 | 9/1987 | Wine | 369/50 |
| 4,796,100 | 1/1989 | Sakaguchi | 369/48 |
| 4,891,760 | 1/1990 | Kashiwazaki et al. | 364/443 |
| 5,107,343 | 4/1992 | Kawai | 358/341 |
| 5,195,066 | 3/1993 | Amemiya et al. | 369/32 |

FOREIGN PATENT DOCUMENTS

| | | |
|---|---|---|
| 59-104778 | 6/1984 | Japan . |
| 62-221028 | 9/1987 | Japan . |
| 63-313171 | 12/1988 | Japan . |
| 64-76321 | 3/1989 | Japan . |
| 1204286 | 8/1989 | Japan . |
| 2-3141 | 1/1990 | Japan . |

*Primary Examiner*—Tommy P. Chin
*Assistant Examiner*—Khoi Truong
*Attorney, Agent, or Firm*—Antonelli, Terry, Stout & Kraus

[57] ABSTRACT

A portable CD-ROM retrieval apparatus, is provided wherein a CD-ROM drive for loading a CD medium, a display for displaying characters and images, an input specifying section for specifying a desired input operation, an audio section for producing sounds, and a data storage for storing data from the CD-ROM drive and the like are connected together through a control section, these devices being housed in a single cabinet. In accordance with one feature, the apparatus can calculate and display statistical information which depends on frequency of data access to the CD medium.

2 Claims, 16 Drawing Sheets

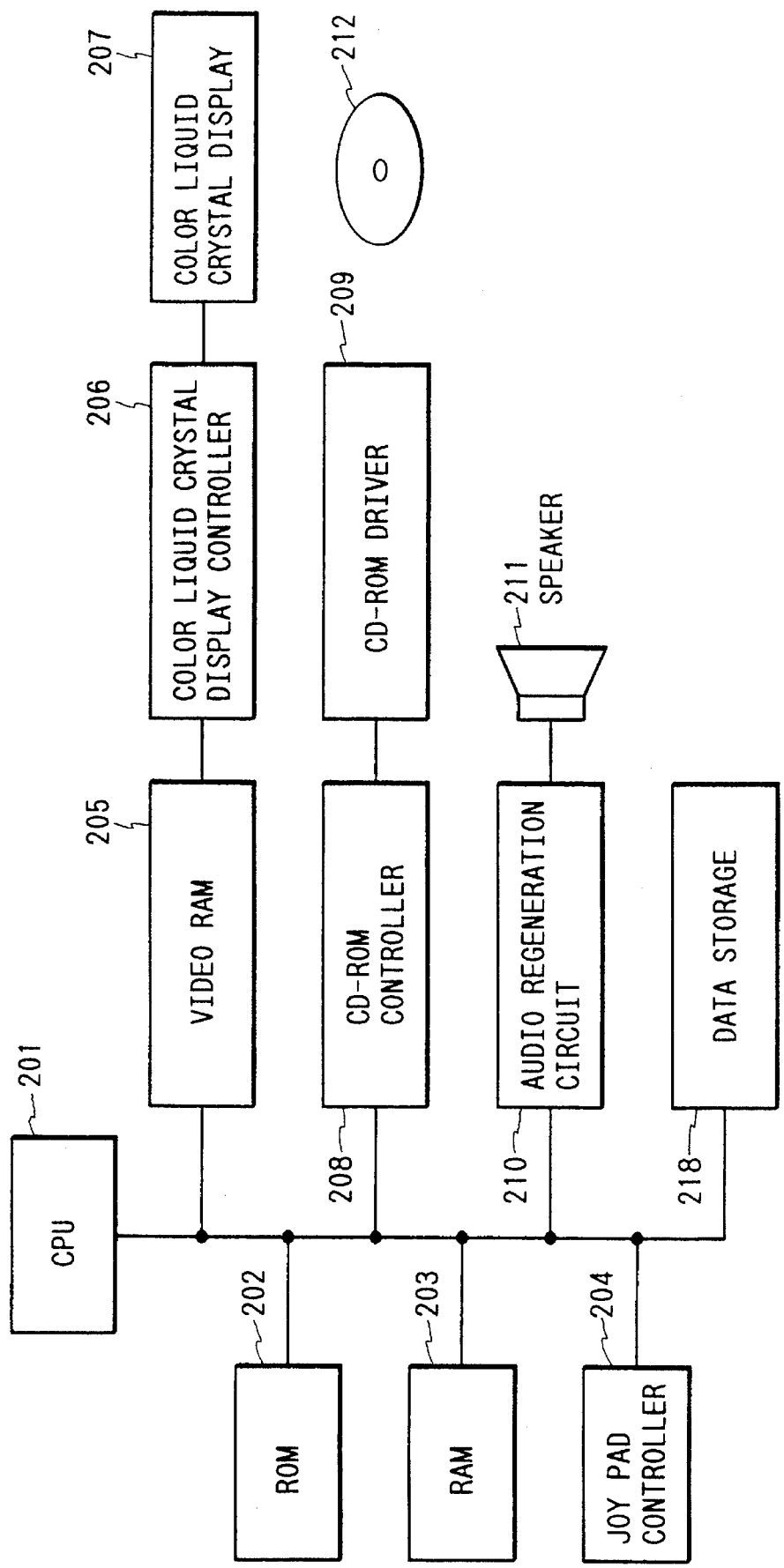

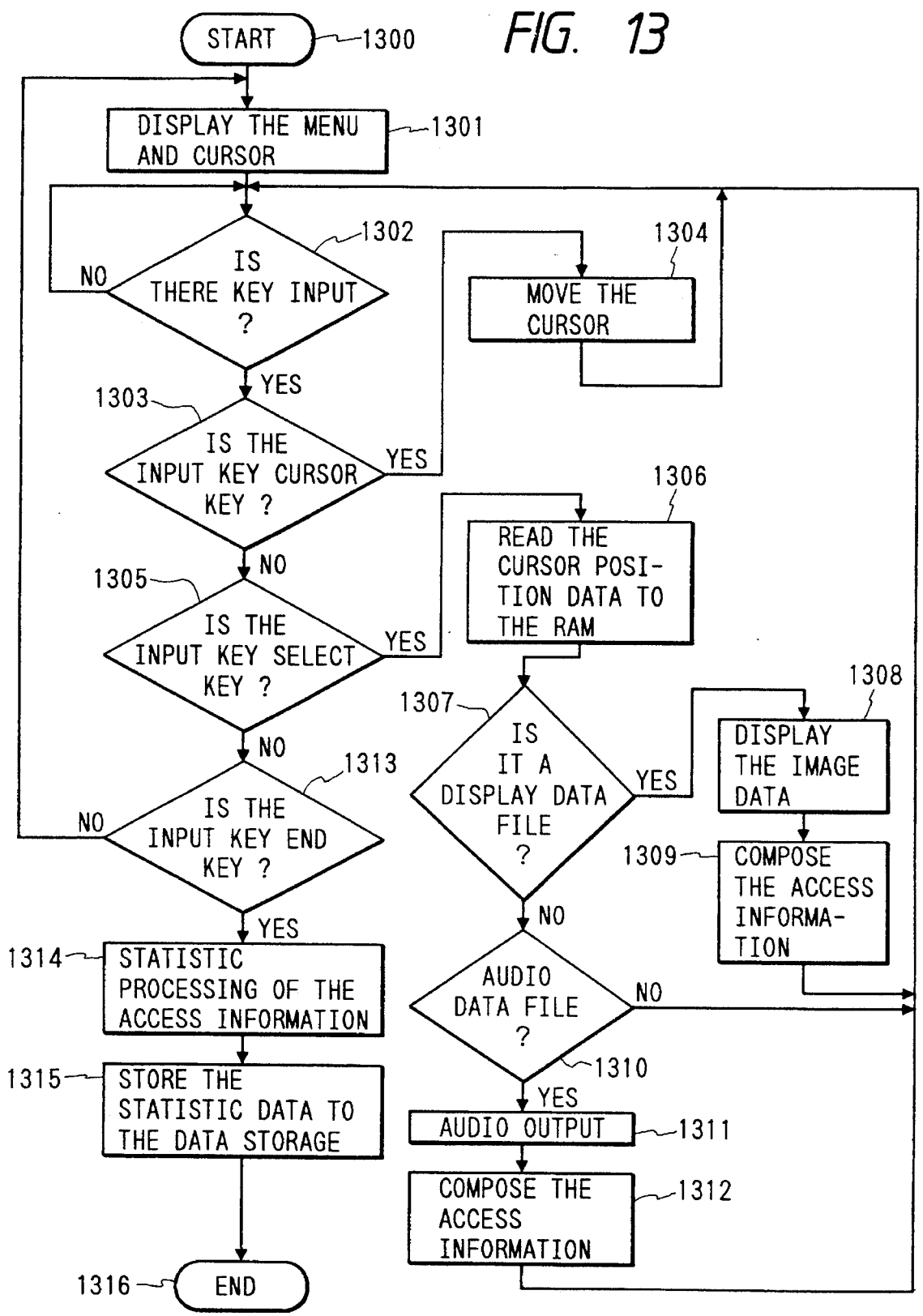

FIG. 14

```
┌─────────────────────────────────────┐
│                                     │
│      DISC NAME (DISK NO.)           │
│                                     │
├─────────────────────────────────────┤
│                                     │
│         KINDS OF DATA               │
│                                     │
├─────────────────────────────────────┤
│                                     │
│      ADDRESS ON THE CD-ROM          │
│                                     │
├─────────────────────────────────────┤
│                                     │
│       FILE NAME (DATA NAME)         │
│                                     │
├─────────────────────────────────────┤
│                                     │
│        ACCESSING FREQUENCY          │
│                                     │
├─────────────────────────────────────┤
│                                     │
│    DATE AND TIME OF THE ACCESSING   │
│                                     │
└─────────────────────────────────────┘
                  ⋮
┌─────────────────────────────────────┐
│                                     │
│ DATE AND TIME OF THE LAST ACCESSING │
│                                     │
└─────────────────────────────────────┘
```

FIG. 16(a)

1. DATA1. DAT    2. DATA2. DAT
3. DATA3. DAT  ▶ 4. DATA4. DAT

SELECT THE DATA WHICH YOU INTEND TO BE DISPLAYED, BY THE CURSOR AND PUSH THE SELECT KEY

FIG. 16(b)

THE DATA TO BE DISPLAYED IS DATA4. DAT

1. BAR GRAPH   ▶ 2. CIRCLE GRAPH
3. TABLE          4. FREQUENCY
                     DISTRIBUTION
                     GRAPH

SELECT THE DISPLAY FORMAT YOU INTEND TO DISPLAY, BY THE CURSOR, AND PUSH THE SELECT KEY

FIG. 16(c)

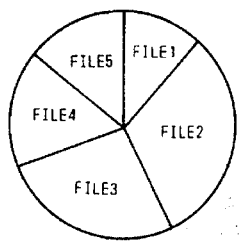

THIS IS THE RETRIEVAL FREQUENCY (%) FOR THE TOTAL TIMES OF RETRIEVAL

TOTAL TIMES OF RETRIEVAL : 200

▶ 1. PRINT   2. CHANGE THE           3. DISPLAY
              DISPLAY FORMAT            OTHER DATA

SELECT THE NECESSARY PROCESS BY THE CURSOR, AND PUSH THE SELECT KEY

FIG. 18
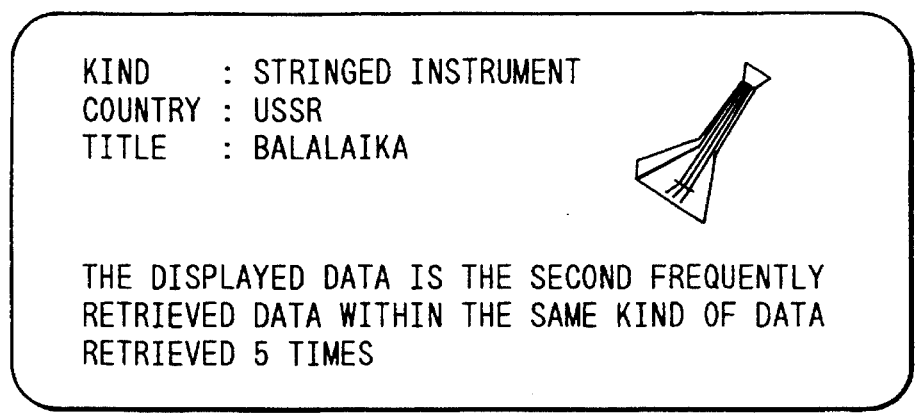
FIG. 19
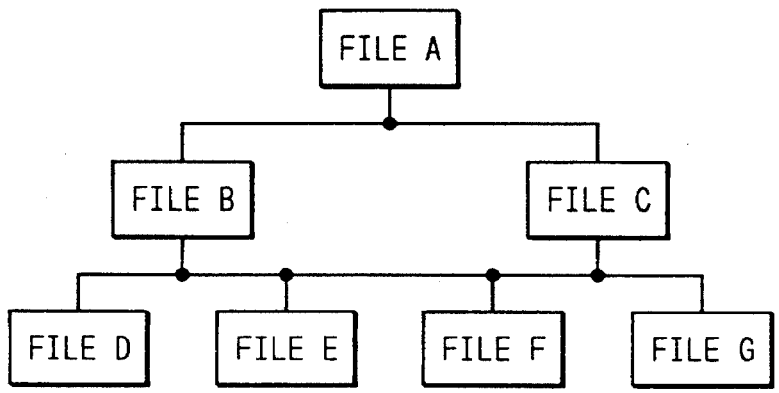
FIG. 20(a)
| FILE D | FILE E | FILE F | FILE G |
|--------|--------|--------|--------|
| 1      | 3      | 0      | 2      |
FIG. 20(b)
| FILE D | FILE E | FILE F | FILE G |
|--------|--------|--------|--------|
| 3      | 2      | 1      | 0      |

CD-ROM RETRIEVAL APPARATUS

This application is a continuation of application Ser. No. 621,041, filed Dec. 3, 1990 now abandoned.

BACKGROUND OF THE INVENTION

1. Field of the Invention

The present invention relates to an integrated CD-ROM retrieval apparatus comprising a CD-ROM drive, a color liquid crystal display, and a joypad.

2. Description of the Prior Art

There have been prior art disclosures about the apparatus of the type of integrated CD-ROM (Compact-Disk-Read only Memory) retrieval apparatus using the color liquid crystal display, for example, in the Japanese Patent Laid-Open 1-204286. This type of prior art apparatus comprises a CD-ROM drive, a display using a color liquid crystal display, a ROM pack, a display directing device using a color liquid crystal display, and a speaker. A menu can be displayed on the display directing device (a color liquid crystal display for displaying the menu) by a retrieving program stored in the ROM pack. A desired menu item is to be selected to output the data in the CD-ROM disk to the color liquid crystal display or speaker.

There have also been prior art disclosures about the retrieving file apparatus, for example, in the Japanese Patent Laid-Open 6476321. This prior art apparatus comprises an optical disk device, a CRT (Cathode Ray Tube), an input keyboard, a control circuit, an image memory, a retrieving circuit, and a counter circuit. The counter circuit can count the number of times that image information is read out of an optical disk. The result is made a part of the retrieved data as an accessing frequency. This feature allows retrieval with the accessing frequency entered to increase the retrieval efficiency. The apparatus also can arrange and output the data in order of the accessing frequency when a retrieving list is created.

However, the prior art CD-ROM retrieval apparatus disclosed in the Japanese Patent Laid-Open 1-204286 needs the ROM pack containing the retrieving program corresponding to the CD-ROM disk one to one. This involves such problems as complicated operation, no provisions for use of the joypad, and use of a special menu display directing device using the color liquid crystal display.

Also, the prior art retrieving information file apparatus retrieval disclosed in the Japanese Patent Laid-Open 64-76321 involves such problems as the access information to be stored is limited to the file access information which can be used as parts of the retrieving means only.

The present invention can solve these problems.

SUMMARY OF THE INVENTION

The CD-ROM retrieval apparatus according to the present invention comprises a CD-ROM drive, a color liquid crystal display for showing characters and images and similar information output of the CD-ROM drive and showing a menu, a joypad as a directing device for selecting a desired menu item, and an audio output circuit to output audio information such as a music or voice. These components are integrated in a single unit. A retrieving program stored in the CD-ROM disk used for retrieval.

Also, the CD-ROM retrieval apparatus of the present invention comprises a counter for counting the access frequency and the like and for statistical processing and a data storage for storing the access information or the statistical information subjected to the statistical processing.

OBJECTS AND ADVANTAGES OF THE INVENTION

In view of the foregoing, it is a general object of the present invention to provide an integrated CD-ROM retrieval apparatus that can show a menu on a display (color liquid crystal display) for selecting a desired menu item with direction of a simple joypad, having no ROM pack containing the retrieving program.

It is another object of the present invention to provide a CD-ROM retrieval apparatus that can effectively use access information in a way that storing can be made of key access information as well as file access information, and the stored access information can be subjected to a statistical process to display.

Other object of the present invention will be obvious from the contents of the specification hereinafter disclosed.

The advantages of the present invention are as follows.

(1) No ROM pack is needed as a retrieving program can be stored in a CD-ROM disk.

(2) Operationability can be increased in a way that a menu for selecting a data file can be shown on the color liquid crystal display, and a desired menu item can be easily selected with use of the simple joypad.

(3) A battery can be used as a power source for the CD-ROM retrieval apparatus of the present invention for indoor and outdoor use.

(4) An external video output allows an external large screen video display to see.

(5) An external audio output allows an external high performance audio apparatus for enjoying powerful stereophonic sounds and the like.

(6) The CD-ROM retrieval apparatus of the present invention can retrieve many compressed data files with use of image files of look-up table type and audio files of ADPCM (Adaptive Differential Pulse Code Modulation) type that are designed for efficient use of the CD-ROM disk.

(7) Key entering in the course of retrieving the data file can be stored and reproduced.

(8) Access frequency of the retrieved data file can be stored to obtain statistical information. The statistical information can be displayed in a variety of ways for use in tabulation of opinionaires and the like.

(9) The retrieved data can be displayed together with their retrieving information on the display for knowing of popularity of the retrieved data.

(10) The CD-ROM retrieval apparatus of the present invention can be used as a teaching machine which provides various educational features, for example, pronouncing foreign words and sentences from a speaker, selecting problems of level difficulty, and explaining problems. It also can make statistical process of right or wrong answers, controlling results of pupils, and tendency of right and wrong answers. This feature allows knowing of weak points and subjects of the pupils so that the problems may be changed.

BRIEF DESCRIPTION OF THE DRAWINGS

Other objects and advantages of the present invention will further become apparent thereinafter and in the drawings in which:

FIG. 12 is a block diagram for a fifth embodiment of the CD-ROM retrieval apparatus according to the present invention.

FIG. 13 is a flow chart illustrating operation of an access information fetching routine in the fifth embodiment according to the present invention.

FIG. 14 is an example of format for access information of a retrieved file in the fifth embodiment according to the present invention.

FIG. 16 is an example of menu displays in the sixth embodiment of the present invention.

FIG. 18 is an example of the display in the seventh embodiment according to the present embodiment.

FIG. 19 is a filing system in the tenth embodiment according to the present embodiment.

FIG. 20 is an example of retrieval frequency information in the tenth embodiment according to the present invention.

DESCRIPTION OF PREFERRED EMBODIMENTS

Figure 1:
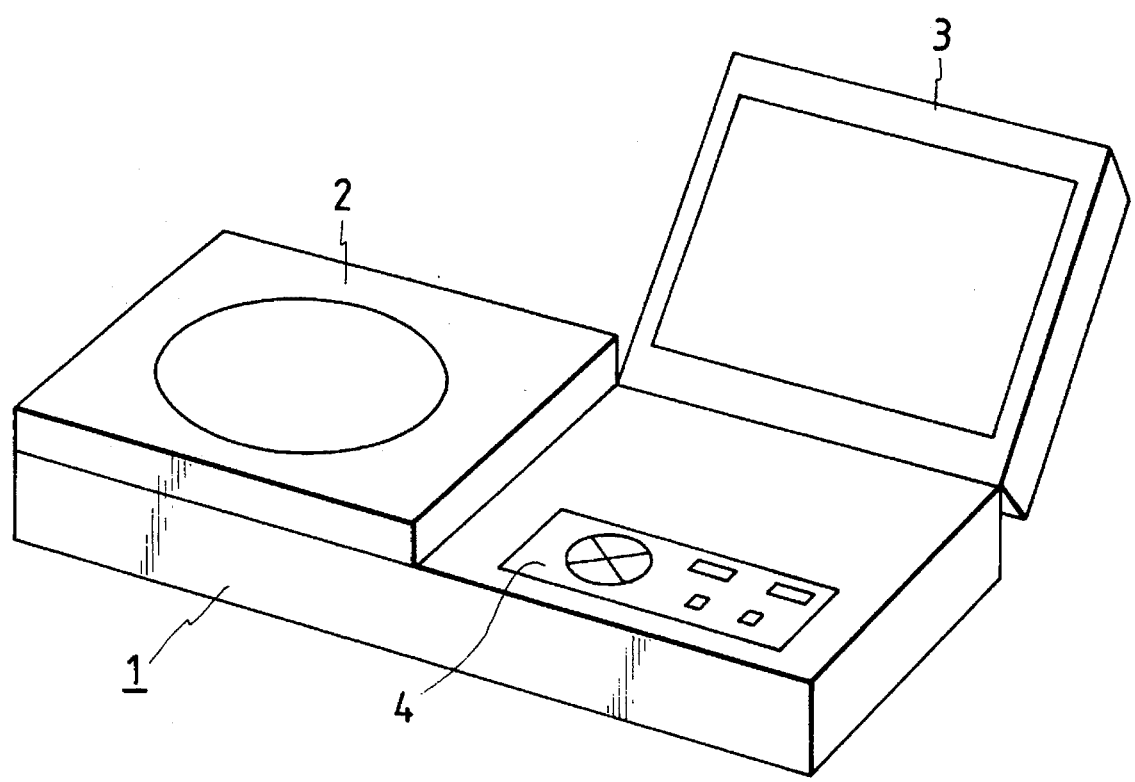
FIG. 1 is an external view of a first embodiment of an integrated CD-ROM retrieval apparatus according to the present invention.

For the purpose of illustration only, the present invention will now be illustrated by the following embodiments. Of course, the present invention shall not be limited to the following embodiments.

In describing the preferred embodiment of the present invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

In the accompanying drawings, FIG. 1 is an external view of a first embodiment of an integrated CD-ROM retrieval apparatus according to the present invention. As seen from the external view, the CD-ROM retrieval apparatus 1 of the present invention is of integrated type in combination of a CD-ROM drive 2, a color liquid crystal display 3, and a joypad 4.

Figure 2:
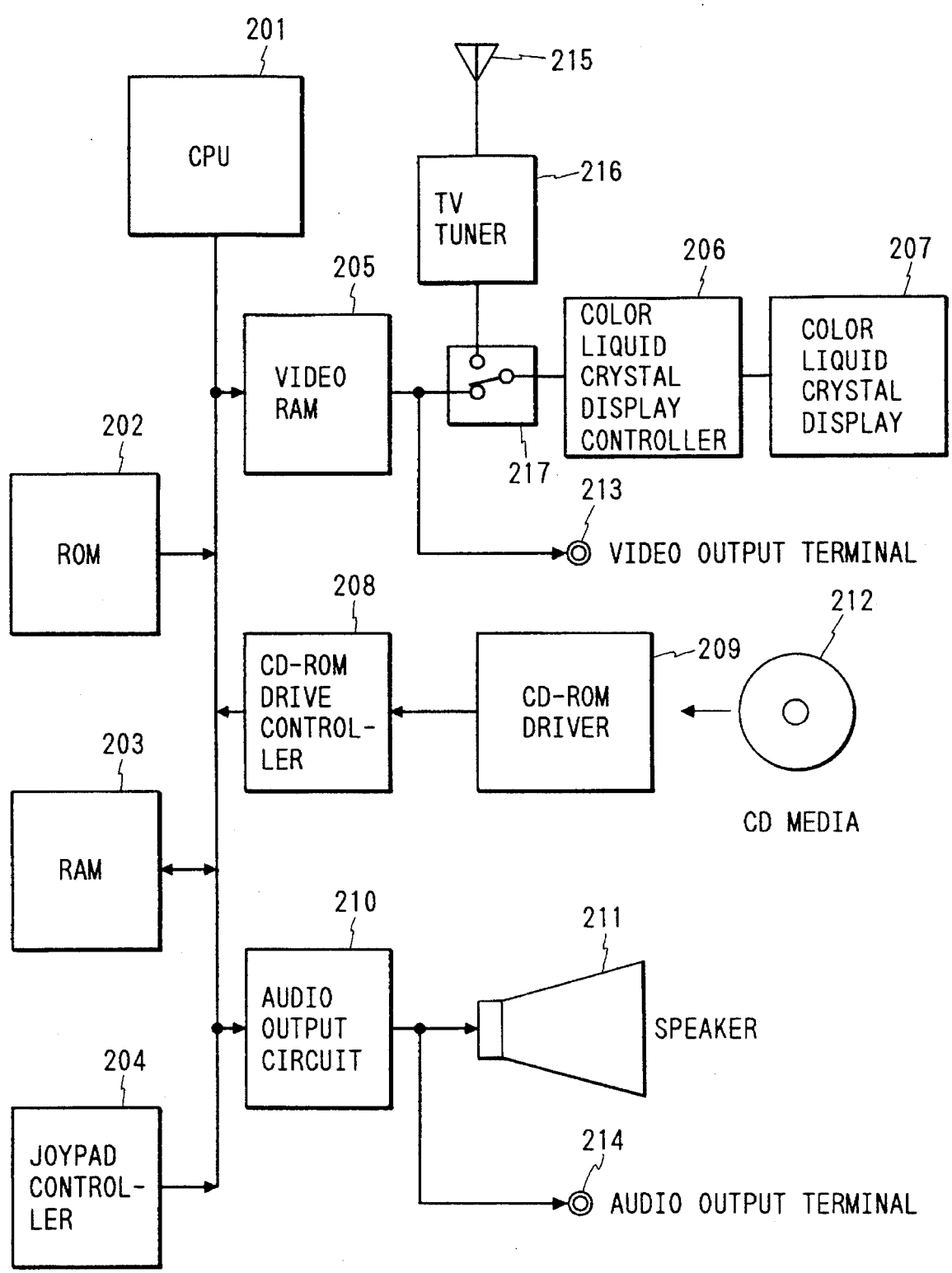
FIG. 2 is a block diagram showing the first embodiment of the present invention.

FIG. 2 is a block diagram showing the first embodiment of the present invention. It includes a basic microcomputer controller comprising a CPU Central Processing Unit 201, a ROM 202, and a RAM (Random Access Memory) 203; a display section comprising a joypad controller 204 as a directing arrangement, a video RAM 205, a color liquid crystal display controller 206, and a color liquid crystal display 207; a CD-ROM section comprising a CD-ROM drive controller 208 and a CD-ROM drive 209; and, an audio section comprising an audio output circuit 210, and a speaker 211.

The CD-ROM drive 209 can ordinarily start as a CD medium 212 is loaded. In the embodiment shown in FIG. 2 a video output terminal 213 and an audio output terminal 214 are provided as external output terminals. In the present embodiment are also provided a television section comprising a television antenna 215 and a television tuner 216. A switch 217 is provided to select either a video signal from the video RAM 205 or a video signal from the television tuner 216.

Figure 3:
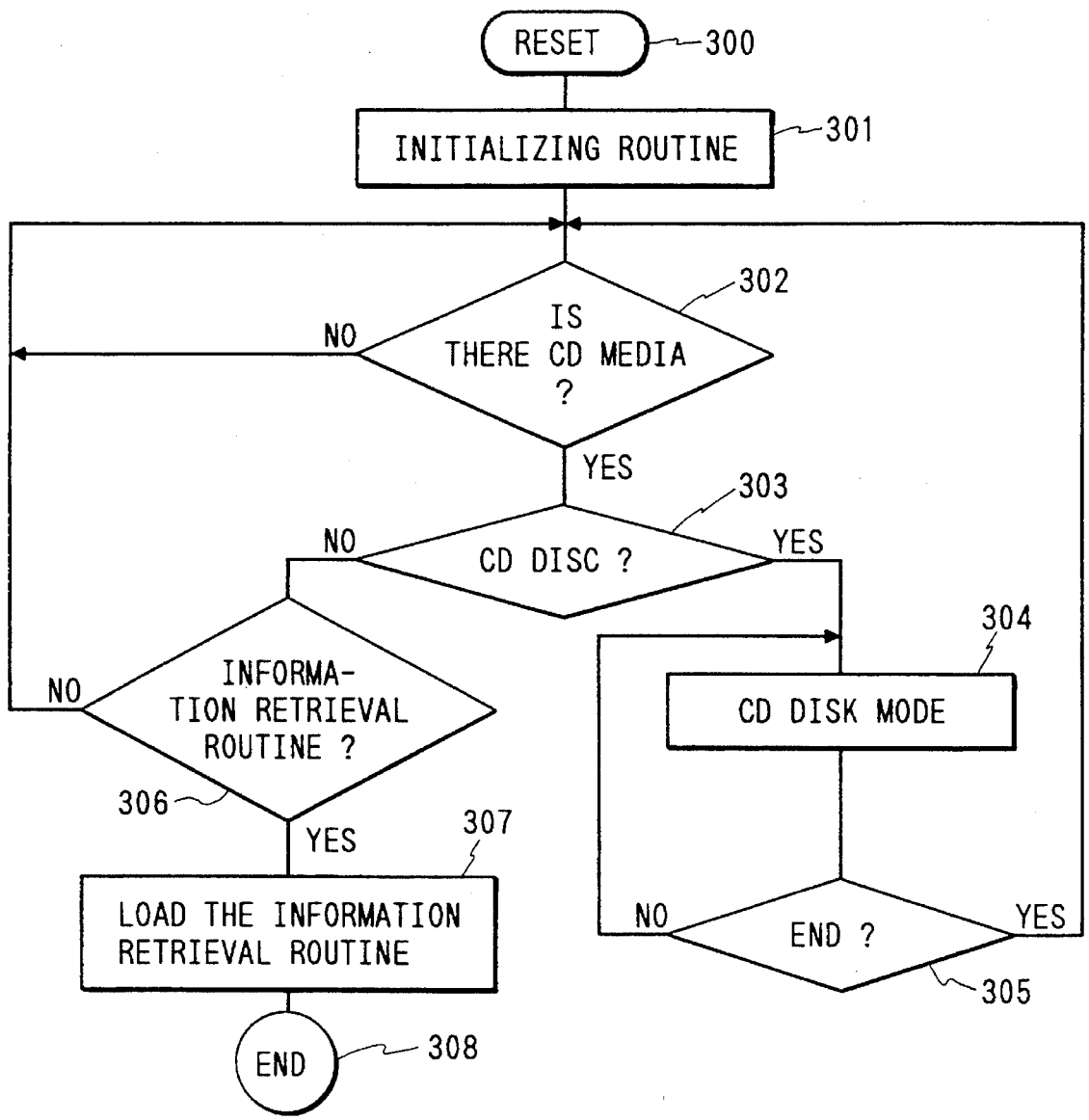
FIG. 3 is the flow chart for a reset routine of the CD-ROM retrieval apparatus when it is powered on or reset.
Figure 4:
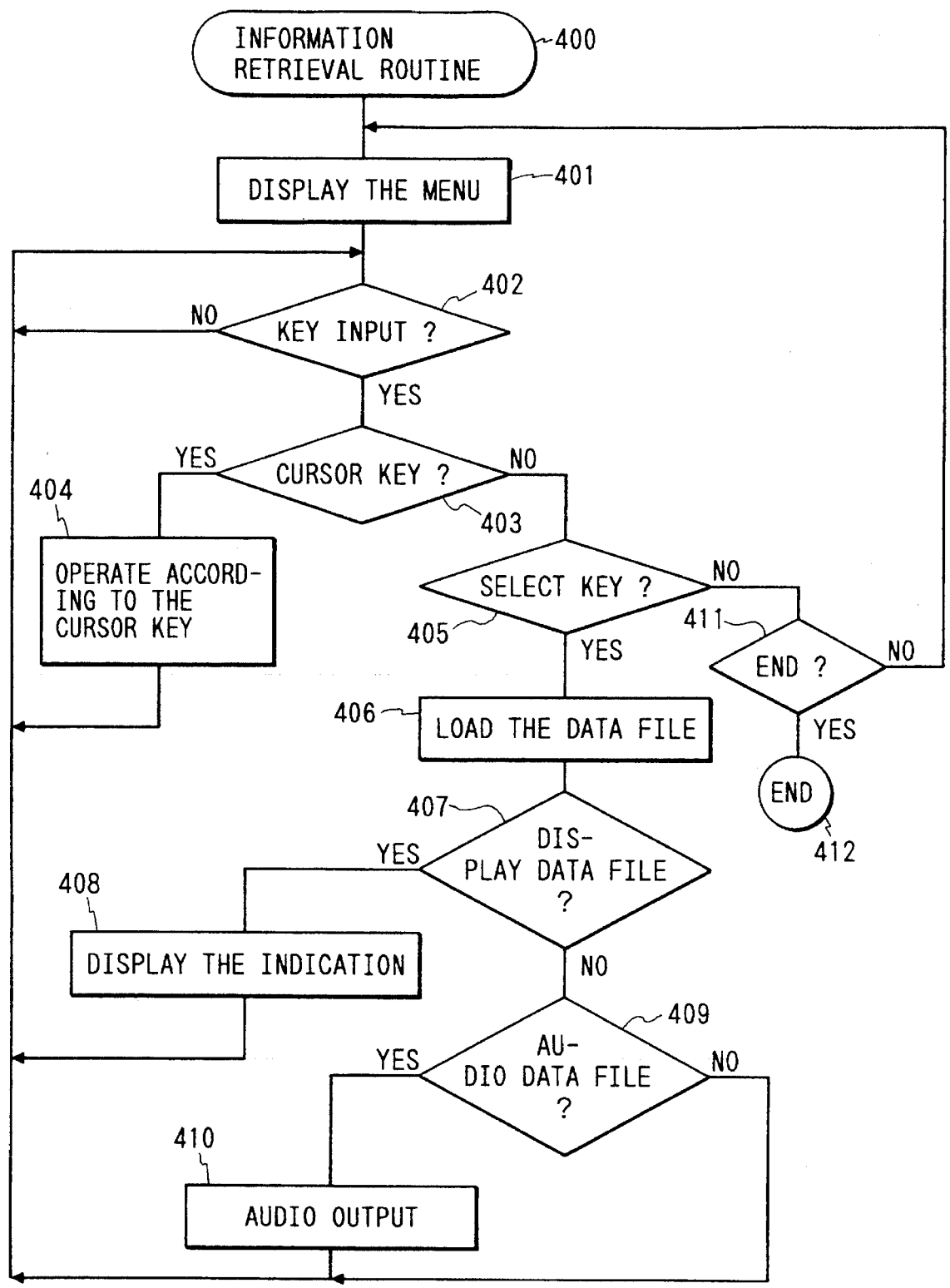
FIG. 4 is the flow chart for a retrieval routine of the CD-ROM retrieval apparatus.

The following describes operation of the CD-ROM retrieval apparatus with reference to the block diagram in FIG. 2 and flow charts in FIGS. 3 and 4. FIG. 3 is the flow chart for a reset routine of the CD-ROM retrieval apparatus when it is powered on or reset. FIG. 4 is the flow chart for a retrieval routine of the CD-ROM retrieval apparatus.

Step 300 shown in FIG. 3 is a reset processing routine in which the CPU 201 shown in FIG. 2 can execute the reset processing routine in FIG. 3 stored in the ROM 202.

Step 301 is an initializing routine where the CPU 201 can clear the data in the RAM 203 and the video RAM 205, reset a CD-ROM drive 209, and mute an audio output circuit 210.

Step 302 can check through the CD-ROM drive controller 208 whether or not a CD medium is loaded in a CD-ROM drive 209. If it is not loaded, the color liquid crystal display 207 can display a message, "Load a disk in place.", and wait for loading Step 303 can check whether the medium loaded is an audio CD disk or data CD-ROM disk.

Step 304 can discriminate a TOC data in a lead-in area of the loaded CD medium if this is the audio CD disk. The color liquid crystal display 207 and the joypad controller 204 are set in the audio CD disk mode of operation. The CD-ROM retrieval apparatus operates as mere audio CD player. The joypad controller 204 shown in FIG. 2 can be used to start, halt, or stop the play, to select a number, or to repeat it until the CD-ROM retrieval apparatus ends the operation as the audio CD player.

Step 305 can return the operation to step 302 when the CD-ROM retrieval apparatus ends as the CD player with end of the play or removal of the CD disk.

Step 306 can check whether a retrieval routine corresponding to the CD-ROM retrieval apparatus of the present invention is recorded in the loaded CD-ROM disk (CD medium 212) if this is for data. If no corresponding retrieval routine is found, the step can display a message, "The loaded disk cannot be used in this CD-ROM retrieval apparatus.", on the color liquid crystal display 207, and returns to step 302.

Step 307 makes the RAM 203 read the corresponding retrieval routine if this is found in the CD medium 212.

Step 308 makes the reset processing routine of the ROM 202 end. The CPU 201 moves to the process in a step 400.

Step 400 is a retrieval routine which is read in the RAM 203. This routine is executed as follows.

Step 401 can display on the color liquid crystal display 207 a retrieval menu and a cursor for selecting the retrieval menu.

Step 402 waits for key entering from the joypad controller 204.

Step 403 checks whether the key entering is a cursor key. Step 404 moves the cursor up, down, left, or right as directed by the key entering if this is the cursor key. The step then returns to step 402.

Step 405 checks whether the key entering is a select key. Step 406 makes the RAM 203 read a data file indicated by the cursor on the menu if the key entering is the select key. Step 407 determines whether the read data file is a display data file of characters or images.

Step 408 transfers the image data to the video RAM 205 if the read data file is the image data. The image data in the video RAM 205 is displayed on the color liquid crystal display 207 by the color liquid crystal display controller 206. If the read data file is a character data file, it is converted to bit map by a character generator (not shown). The bit map is transferred to the video RAM 205. After it is displayed on the color liquid crystal display 207, the step returns to step 402.

Step 409 checks whether the read data file is an audio data file of music or voice. If it is not audio file, the step does nothing, and returns to step 402.

Step 410 outputs the audio data to the speaker 211 through an audio output circuit 210 if the read data file is the audio data file. After the audio data is output from the speaker 211, the step returns to step 402.

Step 411 determine whether the key entering is an end key if the key entering is neither cursor key nor select key. It the key entering does not correspond to any key, the step returns to step 401.

Step 412 ends the retrieval routine.

It should be noticed that the embodiment shown in FIG. 2 is available as color television set as the switch 217 is set in position.

Figure 5:
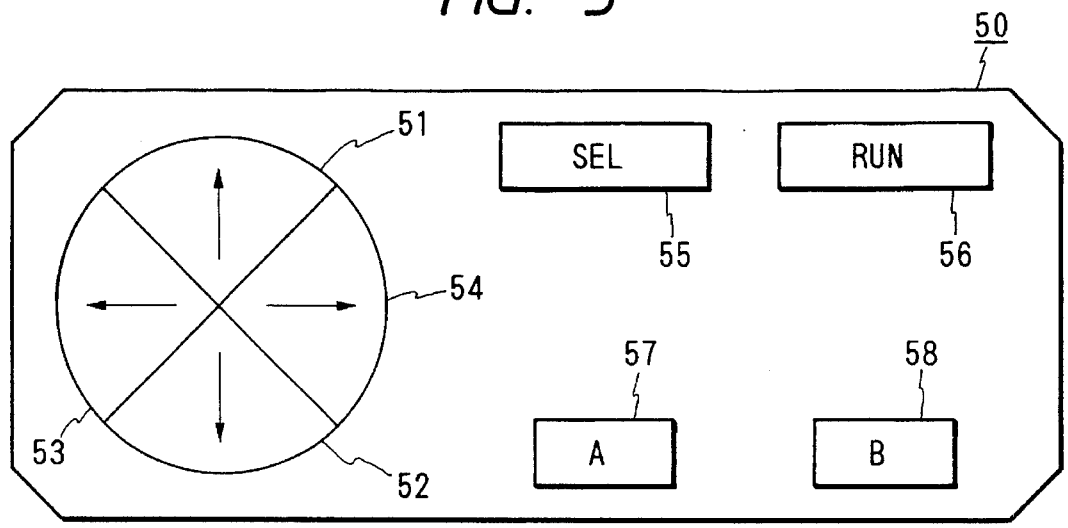
FIG. 5 is an arrangement of the joypad embodied in the present invention.

FIG. 5 shows an arrangement of the joypad 50 embodied in the present invention. In the figure, the joypad 50 comprises cursor keys, including an upward cursor key 51, a downward key 52, a leftward cursor 53, and a rightward cursor key 54, and trigger buttons, including a selection key 55, an execution key 56, a trigger button A 57, and a trigger button B 58. The key representing the end that has been described in FIG. 4 makes use of the trigger button B 58.

Figure 6:
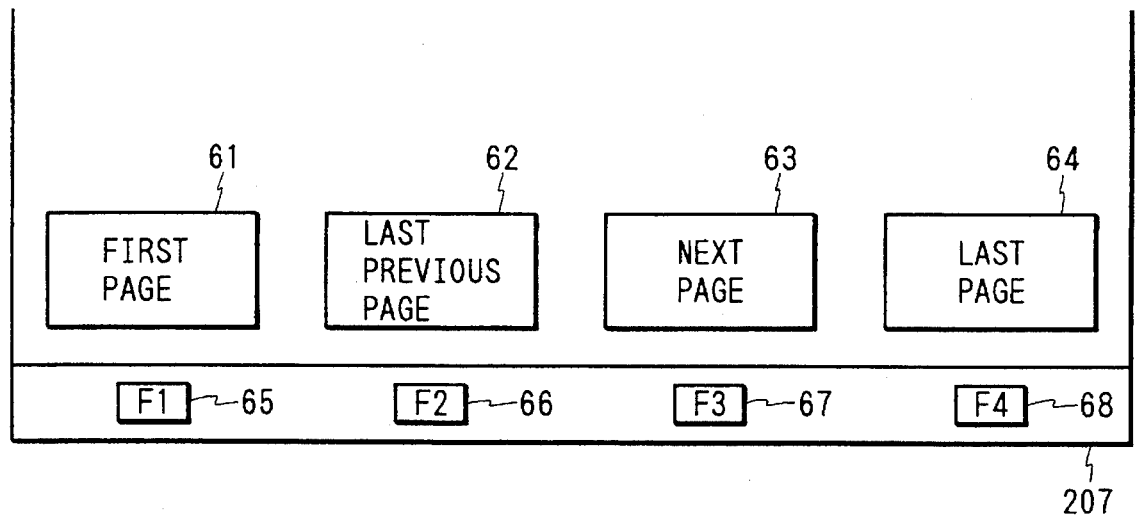
FIG. 6 is an illustration showing a relationship between function display and function keys.

FIG. 6 shows another embodiment of the present invention which is different from the menu selection embodiment. That embodiment is made in a way that the color liquid crystal display 207 has on its lowest line functional indicators, for example, a first page 61, a last previous page 62, a next page 63, and a last page 64, and has function keys F1 65, F2 66, F3 67, and F4 68 corresponding to them. The function keys can select a desired function from among the functional indicators shown on the lowest line of the color liquid crystal display 207. It is possible to select a desired functional indicator at any time which is appropriate to current execution of the process software. This feature is convenient for optimum display together with the joypad.

In the embodiment shown in FIG. 6 are arranged the pushbutton function keys outside the color liquid crystal display 207. Instead, touch-panel function keys may be arranged on the color liquid crystal display 207.

Figure 7:
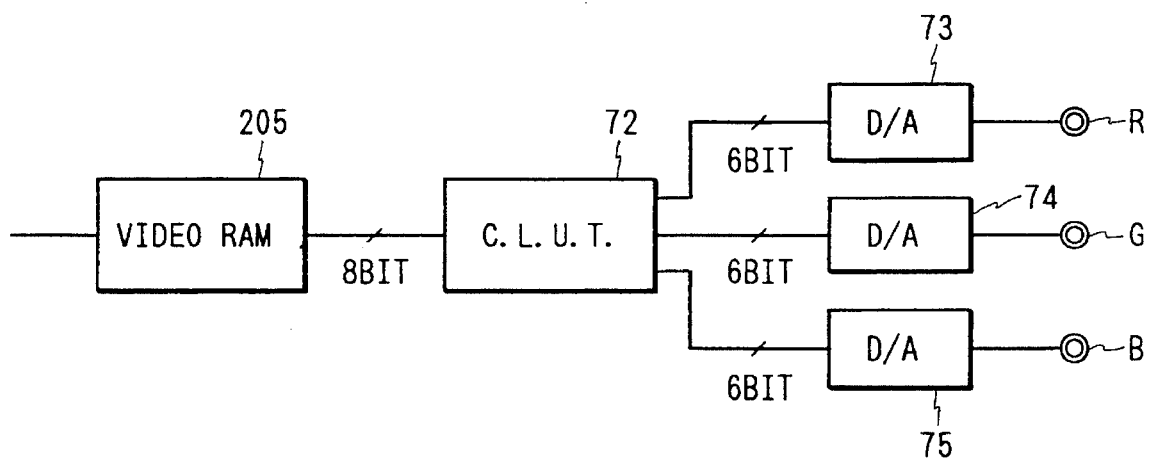
FIG. 7 is a block diagram for an embodiment in which an image file compressed in a look-up table way can be displayed.

FIG. 7 is a block diagram for an embodiment in which an image file compressed in a look-up table way can be displayed. The video RAM 205 has 8-bit data per picture element stored therein. A color look-up table 72 can output a digital signal of 18 bits in total which is sum of three primary color signals of 6 bits, including red, green, and blue signals each. The digital signal outputs are connected to D/A (Digital to Analog) converters 73, 74, and 75 corresponding to them, which convert them to analog red, green, and blue video signals. The color look-up table 72, in other words, can develop the 256 colors in the image data file to 262,144 colors. The look-up table is very effective means to compress the image data file.

Figure 8:
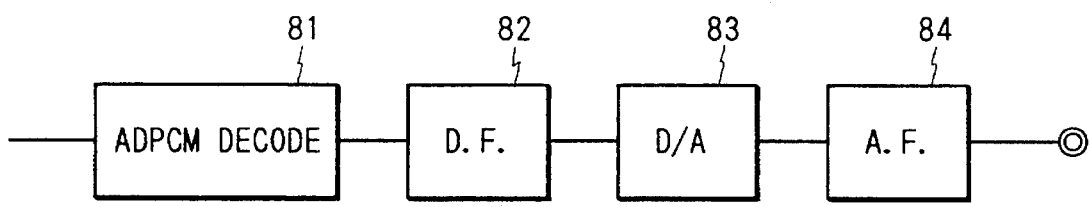
FIG. 8 is a block diagram for playing back an audio file of ADPCM fashion.

FIG. 8 is a block diagram for an embodiment of an audio output system. This is a decoder circuit of audio data file compressed in an ADPCM way. The audio data compressed in the ADPCM way is decoded by an ADPCM decoder circuit 81. The decoded signal is passed through a digital filter 82, a D/A converter 83, and an analog filter 84 in this sequence. The analog filter 84 outputs an analog audio signal. The ADPCM can compress the file size to around ¼ as compared with the CD audio data. It should be noticed that if the sound quality may be on a level of monaural AM broadcast, the file size can be made to around ¹⁄₁₆.

The ADPCM is a very effective means to compress the audio data file and to keep the sound quality as desired.

Figure 9:
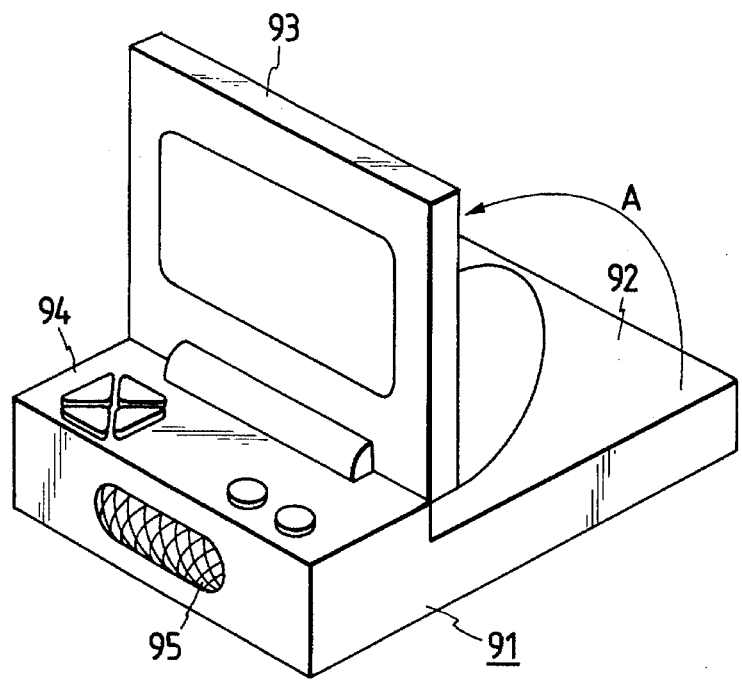
FIG. 9 is an external view of a second embodiment of the integrated CD-ROM retrieval apparatus according to the present invention.

FIG. 9 is an external view of a second embodiment of the integrated CD-ROM retrieval apparatus according to the present invention. As seen from the external view, a CD-ROM retrieval apparatus 91 has a CD-ROM drive 92, a color liquid crystal display 93, a joypad 94, and a speaker 95 housed in a single cabinet. In the present embodiment, the CD-ROM retrieval apparatus 91 is used in a manner that the color liquid crystal display 93 is turned up in the arrow A direction, a CD medium is loaded in the CD-ROM drive 92, and the color liquid crystal display 93 is tilted to an optimum angle to see. The color liquid crystal display 93 can be used as a cover for the CD-ROM drive 92 as it is arranged over the CD-ROM drive 92. This feature means that if the CD-ROM retrieval apparatus 91 is not in use or if it is used as audio CD player, the CD-ROM drive 92 can be covered by the color liquid crystal display 93 to prevent dust and similar foreign matters from entering the CD-ROM drive 92.

Figure 10:
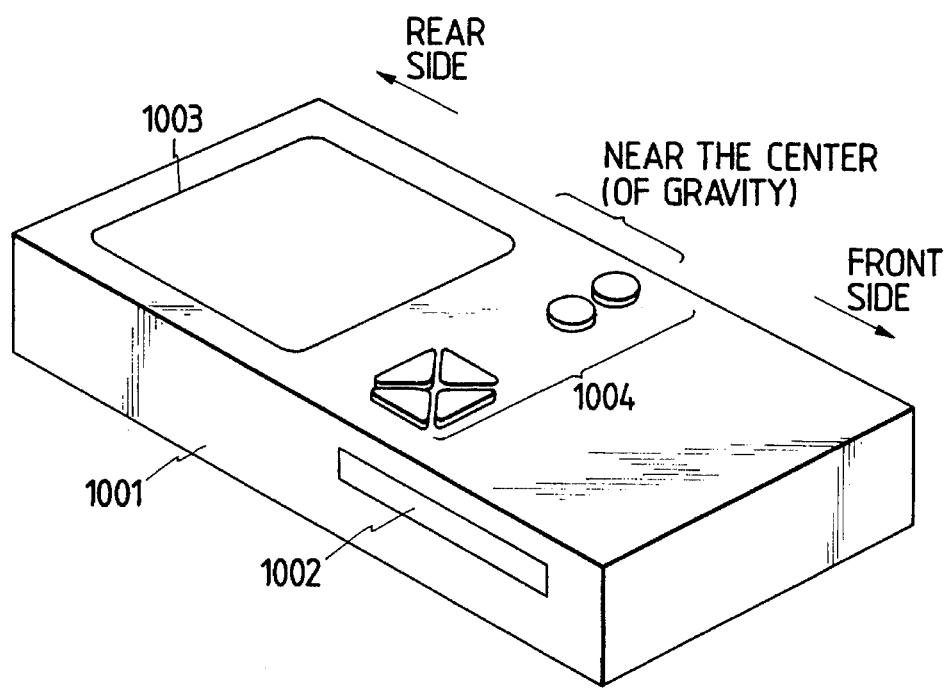
FIG. 10 is an external view of a third embodiment of the integrated CD-ROM retrieval apparatus according to the present invention.

FIG. 10 is an external view of a third embodiment of the integrated CD-ROM retrieval apparatus according to the present invention. As seen from the external view, a CD-ROM retrieval apparatus 1001 is an integrated CD-ROM retrieval apparatus in which a front loading CD-ROM drive 1002, a color liquid crystal display 1003, and a joypad 1004 are integrated in a single unit.

In the present embodiment are arranged the color liquid crystal display 1003 on a rear side of a cabinet and the front loading CD-ROM drive 1002 on a front side thereof to position the center of gravity of the CD-ROM retrieval apparatus 1001 in vicinity of the center of the cabinet. The joypad 1004 is arranged around the center of gravity. This allows the CD-ROM retrieval apparatus 1001 to be easily balanced when entering is made with it held by hand, as the portion supporting the cabinet is near the entering portion. This means that it provides an effect that the operationability is improved.

In the present embodiment, the center of gravity of the CD-ROM retrieval apparatus is positioned near the center thereof. Instead, the joypad may be placed near the center of gravity of the CD-ROM retrieval apparatus to provide the same effect as above even if the center of gravity is at any position.

Figure 11:
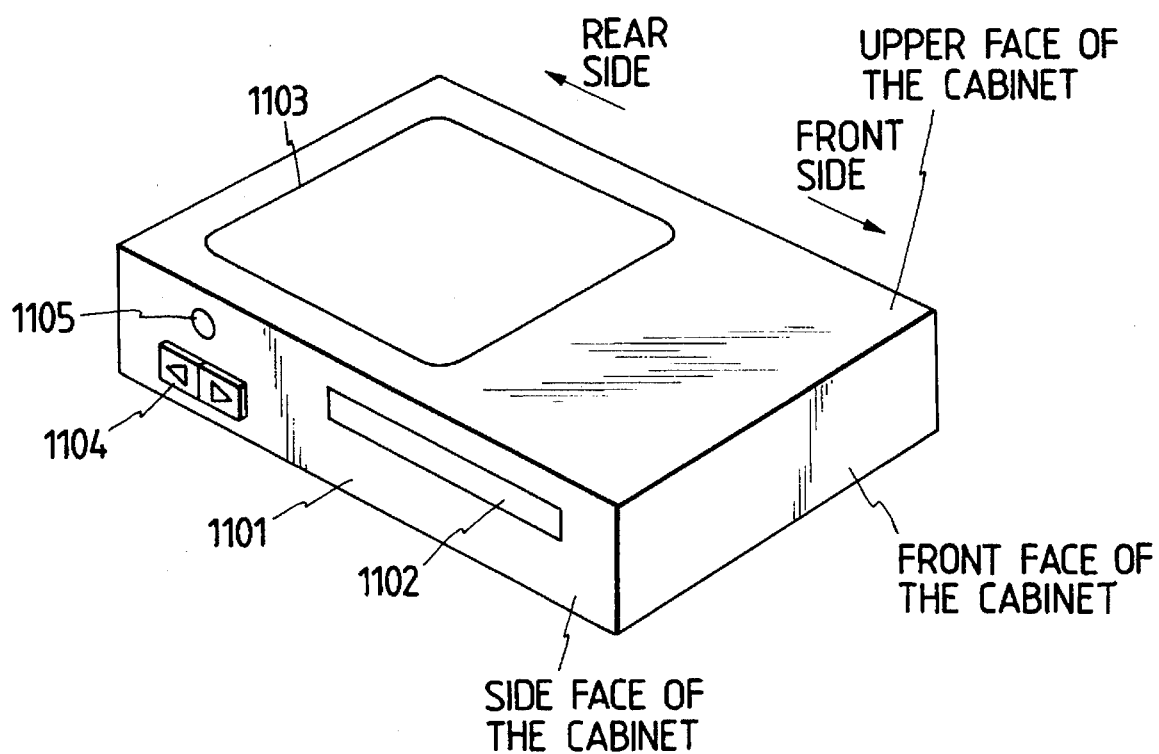
FIG. 11 is an external view of a fourth embodiment of the integrated CD-ROM retrieval apparatus according to the present invention.

FIG. 11 is an external view of a fourth embodiment of the integrated CD-ROM retrieval apparatus according to the present invention. As seen from the external view, a CD-ROM retrieval apparatus 1101 of the present invention is an integrated CD-ROM retrieval apparatus in which a front loading CD-ROM drive 1102, a color liquid crystal display 1103, a direction entering key 1104, and trigger button 1105 are integrated in a single unit.

In the present embodiment, the direction entering key 1104 and the trigger button 1105 are provided on a rear left side of a cabinet of the CD-ROM retrieval apparatus 1101. This allows entering by a thumb of a left hand alone while the cabinet is held by a palm of the left hand. This means that it provides an effect that the operationability is improved.

In the present embodiment, the direction entering key 1104 and the trigger button 1105 are arranged on the rear left side of the cabinet of the CD-ROM retrieval apparatus 1101. Instead, they may be arranged on a right side of the CD-ROM retrieval apparatus 1101 or on both side thereof to provide the same effect as above.

FIG. 12 is a block diagram for a fifth embodiment of the CD-ROM retrieval apparatus according to the present invention. The same blocks and parts as in FIG. 2 are indicated with the same numbers, and are not described again here. The CD-ROM retrieval apparatus in the present embodiment, as shown in the figure, has a data storage 218 comprising a RAM backed up by a battery (not shown) to store data.

The following describes operation of the CD-ROM retrieval apparatus in the fifth embodiment of the present invention with reference to the block diagram in FIG. 12, a flow chart in FIG. 13, and a format in FIG. 14.

In the present embodiment, the CD-ROM retrieval apparatus is used as an information collection aid. The flow chart in FIG. 13 is a routine for retrieving and collecting the information. The format in FIG. 14 is an example of access information of a retrieved file. In FIG. 14, the disk name (disk number) is a name of a CD-ROM (disk number) having a file accessed, the type of data is a kind of data file accessed, such as image data or audio data, the address on the CD-ROM is a physical address on the CD-ROM disk having the data file accessed, the file name (data name) is a file name (data name) of the data file accessed, and the accessing frequency is a frequency at which the retrieved data file has been called. The accessing frequency is one (1) time when the data file is first retrieved. It is increased one by one every time it is retrieved. In addition, the accessed date and time are recorded every time it is accessed.

The following describes the routine with reference to the flow chart in FIG. 13. The operation of the CD-ROM retrieval apparatus with it powered on or reset, however, is omitted as it was already described.

Step 1300 is a start step for a retrieval routine and an information collection routine that was read in the ROM 103. These routines are executed as follows.

Step 1301 can display a retrieval menu and the cursor for selecting a desired menu item on the color liquid crystal display 207.

Step 1302 waits for key entering from the joypad controller 204.

Step 1303 determines whether the entered key is a cursor key.

Step 1304 moves the cursor upward, downward, rightward, or leftward according to the key if it is the cursor key. Then, control is returned to step 1302.

Step 1305 determines whether the entered key is the select key.

Step 1306 makes the data file at the cursor position to be read in the RAM 203 if the entered key is the select key.

Step 1307 determines whether the read data file is a character or image display data file. Step 1308 transfers the image data to the video RAM 205 if the read data file is the image data file. The the image data in the video RAM 205 can be displayed on the color liquid crystal display 207 by the color liquid crystal display controller 206. If the read data file is the character data file, on the other hand, it is converted to bit map by a character generator (not shown). The bit map is transferred to the video RAM 205.

Step 1309 creates access information for the read image information, and stores it in the data storage 218. The access information is formed as in the data format in FIG. 14. If the read image information is first accessed, it is created as having the accessing frequency of 1 (one). After this, the accessing frequency is increased one by one every time the same data file is accessed. The read data file is displayed on the color liquid crystal display 207 to create the access information for the data file. Then, control is returned to step 1302.

Step 1310 determines whether the read data file is audio data file of music and voice. If it is not audio data file, no process is made. Control is returned to step 1302.

Step 1311 outputs the music and voice to the speaker 211 through the audio output circuit 210 if the read data file is audio data file.

Step 1312 creates access information for the read audio data, and stores it in the data storage 218. The access information, as in the image information, is formed as in the data format in FIG. 14. If the read audio data file is first accessed, it is created as having the accessing frequency of 1 (one). After this, the accessing frequency is increased one by one every time the same data file is accessed. The read audio data file is output to the speaker 211 to create the access information for the data file. Then, control is returned to step 1302.

Step 1313 determines whether the key entering is an end key if the entered key is neither cursor key nor select key. If it not any of them, control is returned to step 1301.

Step 1314 reads the access information created till then from the data storage 218 to make statistical process if the entered key represents the end.

Step 1315 stores the statistically processed access information into the data storage 218.

Step 1316 ends the information collection routine.

As described above, in the present embodiment, the data can be retrieved, at the same time the access information of the retrieved data can be collected, and the statistically processed access information can be stored in the data storage 218.

Figure 15:
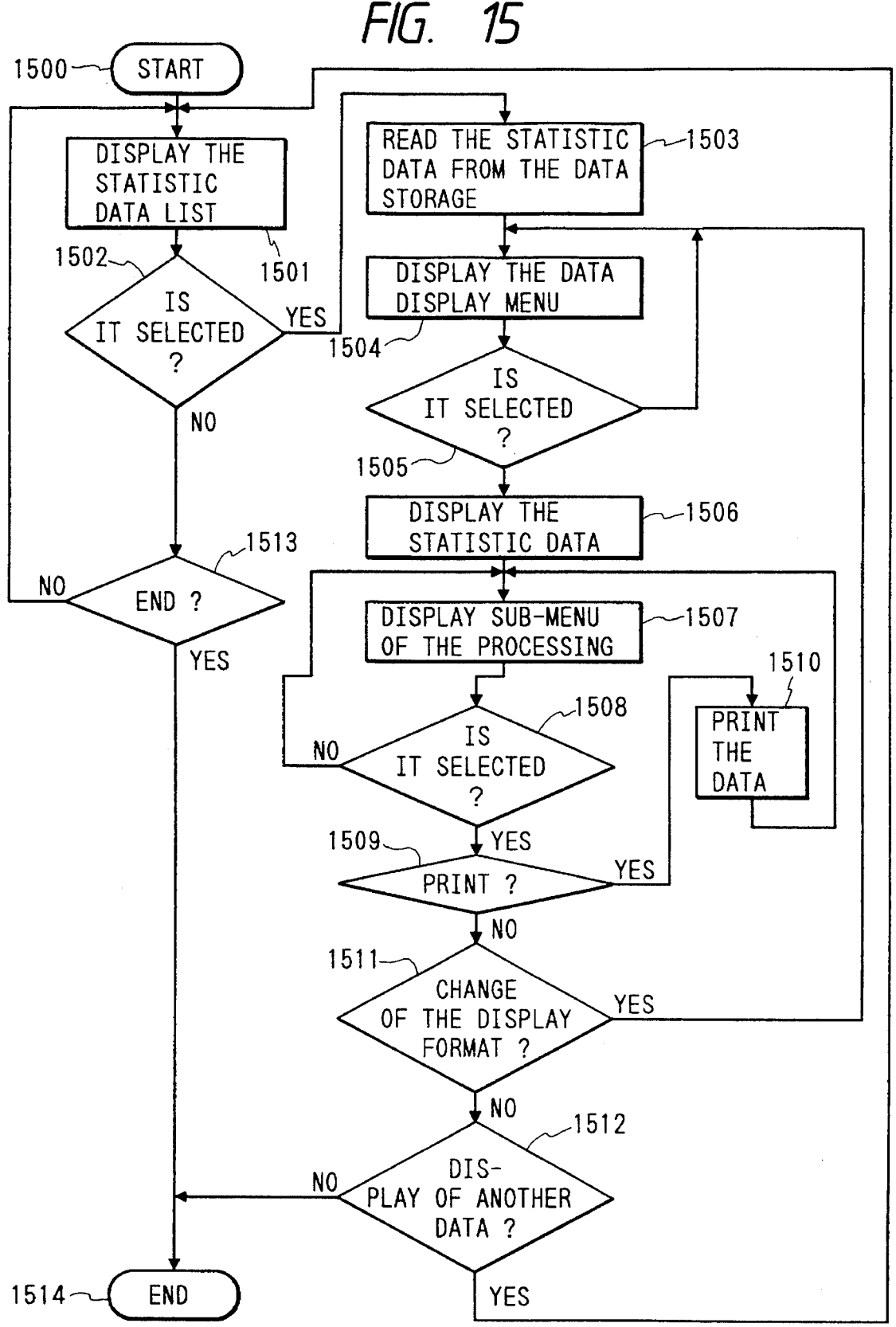
FIG. 15 is a flow chart for a routine that can make the CD-ROM retrieval apparatus display the statistical information created in the sixth embodiment.

In turn, the following describes a sixth embodiment of the present invention with reference to FIGS. 15 and 16. This embodiment relates to a method for displaying the statistical data obtained in the fifth embodiment.

FIG. 15 is a flow chart for a routine that can make the CD-ROM retrieval apparatus display the statistical information created in the sixth embodiment. The following describes the routine with reference to the flow chart in FIG. 15. Assume that before this routine, initialization has been completed according to the flow chart in FIG. 3, and the statistical data display routine has been read in the RAM 203.

Step 1500 is a start step for executing the statistical data display routine read in the RAM 203 as follows.

Step 1501 can display on the color liquid crystal display 207 the menu for selecting the statistical data stored in the data storage 218 and the cursor for selecting a desired menu item. An example of the statistical data selection menu is shown in FIG. 16(a). The list statistical data stored in the data storage 218 should displayed on the screen, a statistical data to be displayed should be selected. In actual operation, the select key should be pressed to select the statistical data indicated by the cursor.

Step 1502 determine whether the select key is pressed. Step 1503 reads the statistical file at the cursor from the data storage 218 if the select key is pressed.

Step 1504 shows on the color liquid crystal display 207 the data display menu of table and graphs and the cursor for selecting a desired menu item. FIG. 16(b) shows the data display menu of table and graphs. This displays the data name selected in step 1503 and kinds of display format. A desired kind of display should be selected with the cursor, and the select key should be pressed.

Step 1505 determines whether the select key is pressed. Control is returned to step 1504 if the entered key is not select key.

Step 1506 displays the statistical data in the selected display format.

Step 1507 displays a menu for processing the displayed statistical data and the cursor for selecting a desired menu item on a portion of the color liquid crystal display 207 which cannot overlap the statistical data. FIG. 16(c) shows the menu for selecting a desired process of the displayed statistical data. The screen shows the statistical data on its top and the process menu on the bottom. A desired process should be selected with the cursor, and the select key should be pressed.

Step 1508 determines whether the select key is pressed. If the select key is not pressed, control is returned to step 1507.

Step 1509 determines the process indicated by the cursor if the select key is pressed.

Step 1510 outputs the statistical data shown on the color liquid crystal display 207 through the video output terminal 213.to a video printer if the process at the cursor is to be printed.

Step 1511 returns control to step 1504 if the process at the cursor is to be changed in the display format.

Step 1512 returns control to step 1501 if the process at the cursor is to display another data. If the process at the cursor is not to change the display format, control advances to step 1514 to end the routine.

In the present embodiment described above, the statistically processed access information can be displayed on the screen by selecting menu with the cursor. As for displaying the statistical data, this can be made with arrangement by the accessing frequency alone, and it may have additional access information including designated dates.

Figure 17:
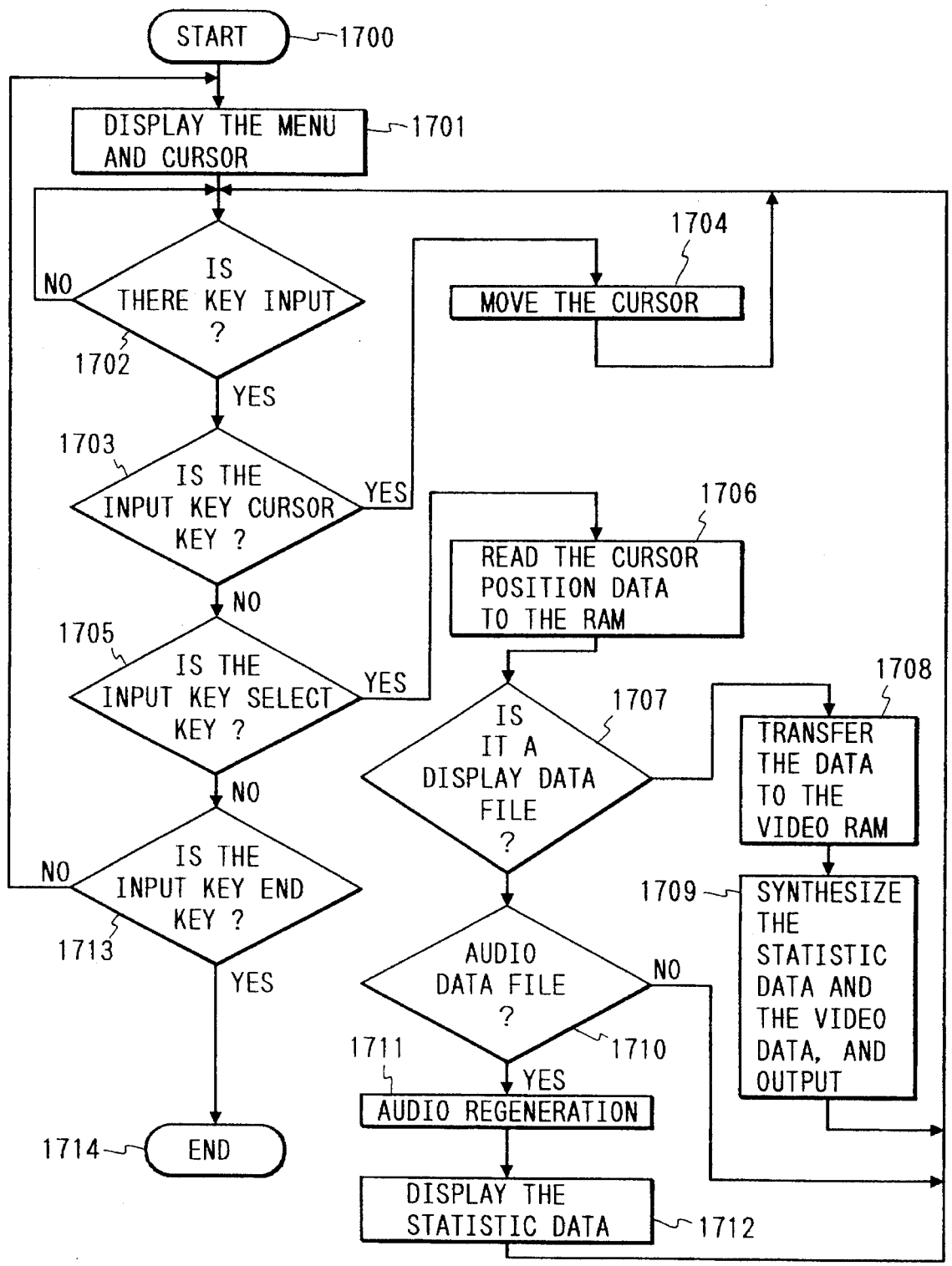
FIG. 17 is a flow chart representing operation in the seventh embodiment according to the present embodiment.

The following describes a seventh embodiment of the present invention with reference to FIGS. 12, 17, and 18. FIG. 17 is a flow chart representing operation of the present embodiment. FIG. 18 is an example of the display in the present embodiment.

The seventh embodiment can display the retrieved data and at the same time show its statistical data when the data is retrieved by the CD-ROM retrieval apparatus, while the sixth embodiment of the present invention displayed the statistical data obtained in the information collection routine.

The following describes operation of the CD-ROM retrieval apparatus in the seventh embodiment with reference to the flow chart in FIG. 17.

Step 1700 is a start step for executing the retrieval routine read in the RAM 203 as follows.

Step 1701 shows on the color liquid crystal display 207 the menu for retrieval and the cursor for selecting a desired menu item.

Step 1702 waits for a key entering from the joypad controller 204.

Step 1703 determines whether the entered key is cursor key. Step 1704 moves the cursor upward, downward, rightward, or leftward according to the key if it is the cursor key. Then, control is returned to step 1702.

Step 1705 determines whether the entered key is the select key.

Step 1706 makes the data file at the cursor position to be read in the RAM 203 if the entered key is the select key.

Step 1707 determines whether the read data file is a character or image display data file.

Step 1708 transfers the image data to the video RAM 205 if the read data file is the image data file.

Step 1709 reads from the data storage 218 the statistical data file for the read data file, and synthesizes it with the image data in the video RAM 205. The data in the video RAM 205 is displayed on the color liquid crystal display 207 by the color liquid crystal display controller 206. FIG. 18 is an example of the display. The read data file is shown on the top of the display, and the statistical data relating to the data on the bottom. After showing on the color liquid crystal display 207, control is returned to step 1702.

Step 1710 determines whether the read data file is audio data file of music and voice. If it is not audio data file, no process is made. Control is returned to step 1702.

Step 1711 outputs the music and voice to the speaker 211 through the audio output circuit 210 if the read data file is audio data file.

Step 1712 reads the statistical data of the read audio file from the data storage 218, and transfers it to the video RAM 205. The data in the video RAM 205 is shown on the color liquid crystal display 207 by the color liquid crystal display controller 206. After the audio data is output from the speaker 211, control is returned to step 1702.

Step 1713 determines whether the entered key represents the end if it is neither cursor key nor select key. If it is not any of them, control is returned to step 1701.

Step 1714 ends the retrieval routine.

The retrieval routine, as described above, can display the retrieved image data and the statistical data related to accessing the image data together. This feature allows the user of the CD-ROM retrieval apparatus to know of interest and similar attentions of other users in the data selected by him.

The following describes an eighth embodiment of the present invention. This embodiment can change the color of the data displayed depending on the number of times of retrieval, while the seventh embodiment showed the the retrieval frequency together with the retrieved data. As an example where the character data DATA1.DATA is shown as in FIG. 16(a), the color of the data can be determined white for one to ten times of retrieval, red for 11 to 20 times, and blue for 21 to 30 times. If the retrieved data is red, the user can know that the it has been retrieved 11 to 20 times.

As explained above, the user can know of the times of the data retrieval as the color of the data displayed is changed depending on the number of times of retrieval.

The following describes a ninth embodiment of the present invention. This embodiment can store historic information of the key entering, while the embodiments described so far store the access information of the retrieved data file. To store the historic information of the key entering is to store the process of a retrieval. If the same retrieval should be made, this can be reproduced easily by using the historic information of the key entering. This feature allows the user to make an automatic retrieval demonstration with use of the historic information of the key entering, or to easily reproduce the data retrieved by other users.

The following describes a tenth embodiment of the present invention with reference to FIGS. 19 and 20. FIG. 19 shows a filing system of the present embodiment, and FIG. 20 shows an example of data for retrieving a file from among the filing system.

If the data files associated with the one retrieved are to be successively retrieved in a hierarchic way, as shown in FIG. 19, the historic information representing the accessing order of the data files is stored. The historic information is statistically processed. This allows a user having accessed a data to know of possibility what data he will access next. In FIG. 19, the retrieving frequencies of the files D, E, F, and G on the lowest level of the hierarchy can be obtained by the first embodiment. However, the retrieving frequencies after successive retrieval of the file A, the file B, and the files on the lowest level can be obtained with the historic information.

FIG. 20 shows an example of the frequent data of the data files obtained. FIG. 20(a) is an example of the order of the frequent data that the file A is retrieved, then the file B is retrieved, and finally the file on the lower level is retrieved. The order frequency data of 0 means that the file has not been retrieved yet. The order frequency data of 1 means that the file has a high possibility of next retrieval after the file A is retrieved, then the file B is retrieved. FIG. 20(b) is an example of the order of the frequent data that the file A is retrieved, then the file C is retrieved, and finally the file on the lower level is retrieved. The frequency information, as seen from the above examples, is different depending on the flow of retrieval. The frequency information can be referenced at the same time that the file A is retrieved, then the file B or C is retrieved. This allows automatic retrieval of next data file having high possibility of retrieval.

Also, in the present embodiment can be displayed the information including a file name having high frequency to be retrieved next. The user then can know of which data the data he has retrieved is highly associated with.

The frequency data can be updated every time retrieval is made. With frequent retrieval of a data file, its probability of retrieval can be made higher.

The present embodiment, as described above, can has an AI function added. That is, a file can be retrieved before the frequency of the data retrieved can be learnt. The frequency data can be used so that after an information is accessed, the information having high probability to be accessed next can be automatically displayed.

Figure 21:
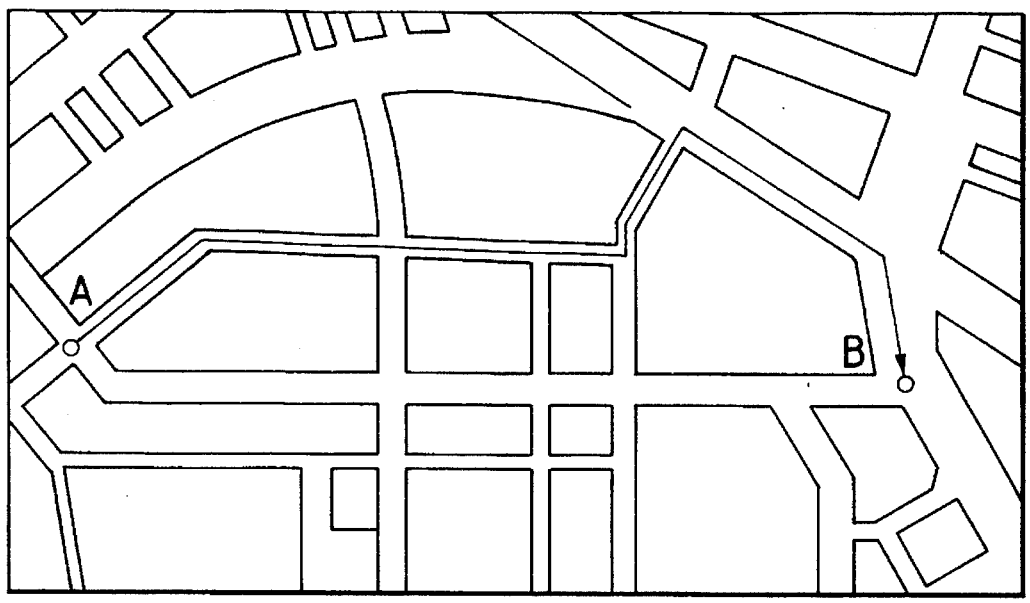
FIG. 21 is a map information display in the eleventh embodiment according to the present invention.

The following describes an eleventh embodiment of the present invention with reference to FIG. 21. The figure is illustration of a map information retrieval with use of the CD-ROM retrieval apparatus.

The map information, as shown in FIG. 21, can be retrieved by using the cursor key, a mouse, or a touch panel that an displayed image can be entered by a finger. In retrieval of road information, tracing a route from a point to another is often searched for as well as showing the points. In FIG. 21, for example, the route from the start point A to the end point B is usually checked by tracing as well the points A and B themselves. All the data including the coordinates of the traced route can be stored. The stored data can be displayed on the screen for the next retrieval of the same map information. This feature is convenient for easy retrieval of the previous road information.

An internal timer arrangement (not shown) can be added to know of a time taken for each course to pass, instants of time when the car passes at some points, congestions of time bands, etc.

The following describes an twelfth embodiment of the present invention. The CD-ROM retrieval apparatus can read contents of the CD-ROM disk in a sequential way of the continuous data like novel. It can store position informations such as the last read page and line. To continue reading, the CD-ROM retrieval apparatus can automatically retrieve the position which is to start reading. In other words, the CD-ROM retrieval apparatus provides a feature like a bookmarker.

Figure 22:
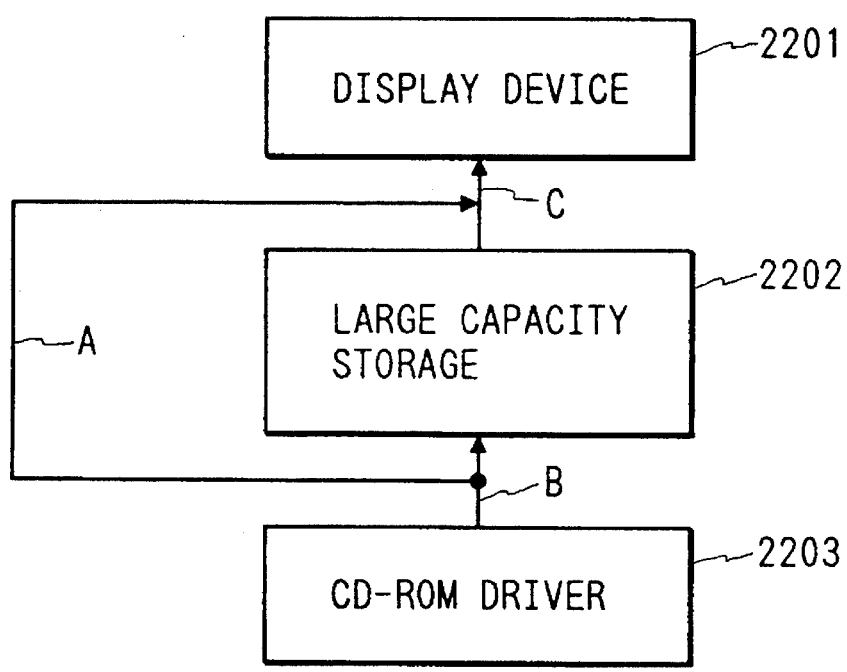
FIG. 22 is a data flow diagram in the thirteenth embodiment according to the present invention.

The following describes an thirteenth embodiment of the present invention with reference to FIG. 22. The figure is a block diagram representing a flow of the data retrieving operation of the present embodiment. It comprises a data display device 2201, a large capacity storage 2202 that can store a plurality of data files read from the CD-ROM, and a CD-ROM drive 2203. In the figure, line A is a data flow line through which the data can be directly transferred from the CD-ROM drive 2203 to the display device 2201, line B is a data flow line through which the data file read from the CD-ROM drive 2203 can be stored in the large capacity storage 2202, and line C is a data flow line through which the data can be transferred from the large capacity storage 2202 to the display device 2201.

The access information in the embodiments described so far represented the one when it was retrieved from the CD-ROM. That was the information retrieved in the data flow indicated by the line A in FIG. 22. In the present embodiment, on the other hand, the CD-ROM retrieval apparatus which has the large capacity storage 2202 capable of storing the plurality of data files can store the data from the CD-ROM drive 2203. The data file selected by a directing device can be transferred from the large capacity storage 2202 to the display device 2201. The information retrieved in the present embodiment, therefore, is the information retrieved in the data flow indicated by the line C in FIG. 22.

The information retrieved can be statistically processed as in the other embodiments. This allows the CD-ROM retrieval apparatus in the present embodiment to achieve all the effects as in the other embodiments.

In the present embodiment, as described above, the information to be retrieved includes the one read from the externally connected large capacity storage 2202. Even when the data from the CD-ROM drive 2203 is stored in the large capacity storage 2202 once, and the data is transferred to the display device 2201, the effects of the present invention can be preserved as in the other embodiments.

In the embodiments of the present invention described so far, the information to be displayed may be catalogue information. Client users can freely retrieve the catalogues so that they can automatically access and collect desired data. This retrieval of information is available for simple market research what information they are interested in.

The access information taken as example in the embodiments were the information of data retrieved only. The user information also may be entered in the menu fashion. This allows collection of further detailed access information.

It is evident that the data stored in the data storage can be transferred out with use of a port (not shown) such as RS-232C or similar serial communication port or general purpose extension IO port; conversely, external data can be transferred to the data storage to store with use of the port.

The effects of the present invention can be achieved in many other modifications, for example, that (1) the joypad can be replaced by a track ball, a joy stick, a jog shuttle, a mouse, a touch panel, a tablet, or similar directing device; (2) the RAM backed up by battery can be replaced by a RAM card, an IC card, an EEPROM, a floppy disk, a non-volatile RAM disk, or similar media capable of storing data; and, (3) the CD-ROM disk can be replaced by an adding optical disk, an alterable optical disk, a hybrid ROM-RAM optical disk, or similar optical disks to store the statistical data.

While the principles of the present invention have been described above in connection with specific embodiments, and particular modifications thereof, it is to be clearly understood that this description is made only by way of example and not as a limitation on the scope of invention.

What is claimed is:

1. A CD-ROM (Compact Disk-Read Only Memory) retrieval apparatus comprising:

a CD-ROM drive for loading a CD medium;

a display for displaying characters and images;

input specifying means for specifying a desired input operation;

audio means for producing sounds;

means for retrieving information in said CD medium;

storage means for storing a sequence of data which indicates accessing information of each retrieving operation performed by said retrieving means, said accessing information including the time of day at which accessing occurs, the time of day at which the last accessing occurred and kind of information to be retrieved in each retrieving operation based upon said desired input operation performed by said input specifying means;

counting means for counting the number of the retrieving operations for each kind of information to be retrieved; and means for providing the accessing information and the number of previous retrieving operations to provide history of previous retrieving operations for evaluating the retrieved information from said CD medium, wherein the CD-ROM drive, the display, the input specifying means, the audio means, the retrieving means, the storage means and the providing means are connected to a control means for controlling the CD-ROM drive, the display, the input specifying means, the audio means, the retrieving means, the storage means and the providing means to perform their respective operations, and wherein at least the CD-ROM drive, the display, the audio means, the retrieving means, the storage means, the providing means and the control means are housed in a single cabinet.

2. A CD-ROM (Compact Disk-Read Only Memory) retrieval apparatus according to claim 1, wherein said accessing information includes the date at which the accessing occurs and the date at which the last accessing occurred.

* * * * *